United States Patent [19]

Martin

[11] 4,424,125
[45] Jan. 3, 1984

[54] SEPARATOR APPARATUS
[75] Inventor: Edward T. Martin, Ontario, Canada
[73] Assignee: Axis Products Limited, Georgetown, Canada
[21] Appl. No.: 330,253
[22] Filed: Dec. 14, 1981
[51] Int. Cl.³ .......................................... B01D 29/36
[52] U.S. Cl. .................................. 210/104; 210/106; 210/413
[58] Field of Search ................ 210/104, 106, 413, 414

[56] References Cited

U.S. PATENT DOCUMENTS

| | | | |
|---|---|---|---|
| 2,861,688 | 11/1958 | Harms | 210/413 |
| 3,194,399 | 7/1965 | Harms | 210/106 |
| 3,347,378 | 10/1967 | Arnold et al. | 210/106 |
| 3,599,795 | 8/1971 | Worlidge | 210/413 |
| 4,145,280 | 3/1979 | Mindelberk et al. | 210/108 |
| 4,329,230 | 5/1982 | Quin | 210/413 |

Primary Examiner—John Adee

[57] ABSTRACT

Separator apparatus for separating a mixture of liquids and solids and having a separator tank, means for passing a mixture of liquids and solids to the tank, screen means in the separator tank dividing it into a mixture compartment, on one side, and a filtrate compartment on the other side, means for removing such mixture from the mixture compartment, liquid conduit means extending from the filtrate compartment of the separator tank, scraper means for moving solid materials from the screen, and being movable momentarily away from such screen.

8 Claims, 4 Drawing Figures

SEPARATOR APPARATUS

The invention relates to separator apparatus for separating solids from liquids, and to a method of separation.

BACKGROUND OF THE INVENTION

Separation, or recovery of solids from liquids is required in a variety of different situations. Where such solids are very finely divided particulate matter, such separation can become difficult and time consuming. Filters for separating very fine materials are relatively costly, and require extensive maintenance so that they do not become plugged.

Where the investment is warranted, then it is no doubt possible to find satisfactory solutions. But in many cases where the value of the recovered solids is not sufficient to warrant it, it is not worthwhile investing in expensive separation machinery, and consequently the solids are lost.

The same considerations are obviously true where it is desired to separate and purify liquids containing such finely divided particulate solid material.

Mixtures of solids and liquids may vary widely in proportions of solids to liquids. The solids may vary widely in particle size and also in material content. Some solids may be a mixture of fine and coarse particles. Other solids may contain large lumps of hard material such as stones, metal refuse and the like.

Separators should preferably be able to handle such a wide variation of mixtures, and be operable in a variety of different modes, so as to provide efficient economical separation in all cases. At the same time such equipment should be capable of reliable, trouble-free operation notwithstanding the abuse or misuse to which it will usually be subjected both by the content of the mixture, and, in many cases, by the operators of the equipment themselves.

BRIEF SUMMARY OF THE INVENTION

With a view to solving these various problems the invention comprises separator apparatus having a separator tank, means for passing a mixture of liquids and solids to the separator tank, and means for returning such mixture from the separator tank, screen means in said separator tank dividing said separator tank into mixture compartment, on one side of said screen means, and a filtrate compartment on the other side of said screen means, and liquid conduit means extending from said filtrate side of said separator tank, and cleaning means for moving solid materials from said screen means.

The invention further comprises such separator apparatus and having pump means for pumping mixture to the separator tank, and liquid level sensing means in said tank for sensing the level of mixture in said tank for controlling said pump means.

The invention further comprises such separator apparatus and having cleaning means which form a separate integral unit, and which is moveable relative to the screen means so as to accommodate larger components or obstructions in the solids content of the mixture, without damage to itself or the screen means.

The invention further comprises such separator apparatus and having valve means controlling flow of said unfiltered mixture from said separator tank, and further having control means for timing the operation of said pump means for pumping mixture to the separator tank, whereby the same may be operated alternately.

The invention further comprises a method of separating a mixture of finely divided solids and liquid and comprising passing such mixture into a separator tank containing a screen means, and permitting filtrate to pass through said screen means, and removing unfiltered mixture from said separator tank, and supplying further unfiltered mixture to said separator tank, and continuously removing filtrate from said separator tank, said finely divided solids being retained on said screen and progressively building in thickness until flow of filtrate is restricted, draining said separator tank, and subsequently removing solids on said screen.

The invention further comprises such a method wherein mixture is continuously supplied to and returned from said separator tank.

The invention further comprises a method wherein mixture is alternately supplied to, and subsequently removed from said separator tank.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
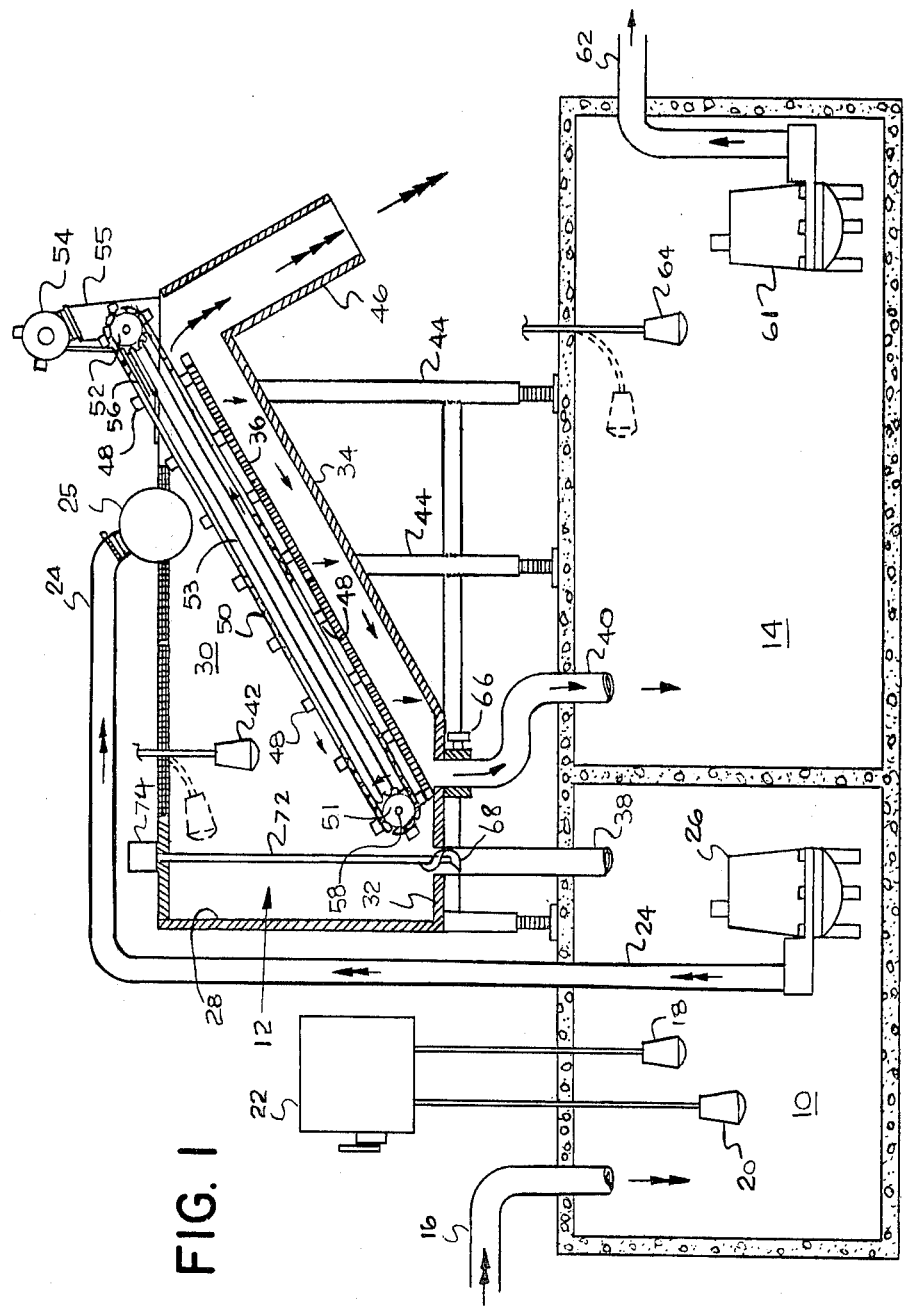
FIG. 1 is a schematic side elevation of a separator according to the invention.

Referring first of all to FIG. 1, the separator apparatus shown in this embodiment for the purposes of illustration only will be seen to comprise a tank 10 for containing unfiltered mixture, a separator tank 12, and a storage tank 14 for containing liquid filtrate.

Tank 10 receives unfiltered mixture from any source, such mixture typically being a mixture of liquid and solids, through any suitable conduits such as pipe 16. Pipe 16 may of course simply be an open channel, the pipe 16 being shown merely by way of example.

It will be understood that tanks 10 and 14 are illustrated merely by way of example. The mixture of unfiltered materials may be supplied to the separator tank 12 with or without the use of tank 10, and its components.

Tank 14 is merely a convenient means of storing unfiltered liquids for subsequent disposal or use. Any other form of storage or disposal may be utilized. In many cases the liquid may be re-cycled for flushing or cleaning purposes several times over.

Tank 10 is provided with high and low level sensors 18 and 20. Sensors 18 and 20 are connected to a control panel 22. A supply conduit 24 extends from within tank 10 upwardly, and communicates with distribution header 25 attached to separator tank 12. Mixture is forced up the pipe 24 by means of pump 26.

Separator tank 12 is of generally rectangular shape in plan, but in elevation, will be seen to have one generally vertical end wall 28, and two side walls 30. However, the bottom of tank 12 will be seen to comprise a generally horizontal bottom portion 32, and a sloping bottom portion 34. A sloping screen 36 is mounted in tank 12 parallel to sloping bottom wall 34. Screen 36 effectively divides tank 12 into two separate compartments, namely a mixture compartment containing unfiltered mixture, and a filtrate compartment between screen 36 and bottom 34 being adapted to receive filtrate, i.e. filtered liquids.

Two separate drain pipes are provided for separator tank 12, for respectively draining unfiltered mixture, and filtrate.

Mixture drain 38 communicates with the main or mixture compartment of tank 12, through horizontal bottom wall portion 32, and extends downwardly into tank 10.

Filtrate drain 40 communicates with the filtrate compartment of tank 12 lying between screen 36 and sloping bottom wall 34, for draining filtrate. Drain 40 communicates with filtrate tank 14.

A liquid level sensor 42 is provided in separator tank 12, and communicates with sensing means 18, for controlling the operation of pump 26.

Any suitable supports such as legs 44 may be provided for sloping bottom wall 34.

A solids delivery chute 46 is provided at the upper end of sloping bottom wall 34, for guiding solids during the removal operation.

It is intended that during normal operation a cake of solids will build up on the upwardly directed surface of screen 36, and eventually will prevent further percolation of filtrate.

When this occurs, it is then necessary to remove the accumulated solids or so-called "filter cake". It is usually intended that this filter cake shall be recovered and in most cases re-used, and it is in any case desireable to remove it as far as possible completely, and without losing any portion of it back in the separator tank 12.

Filter cake removal is therefore achieved while the tank 12 is empty, i.e. after all remaining mixture has been drained from separator tank 12 into tank 10, through drain 38.

Figure 4:
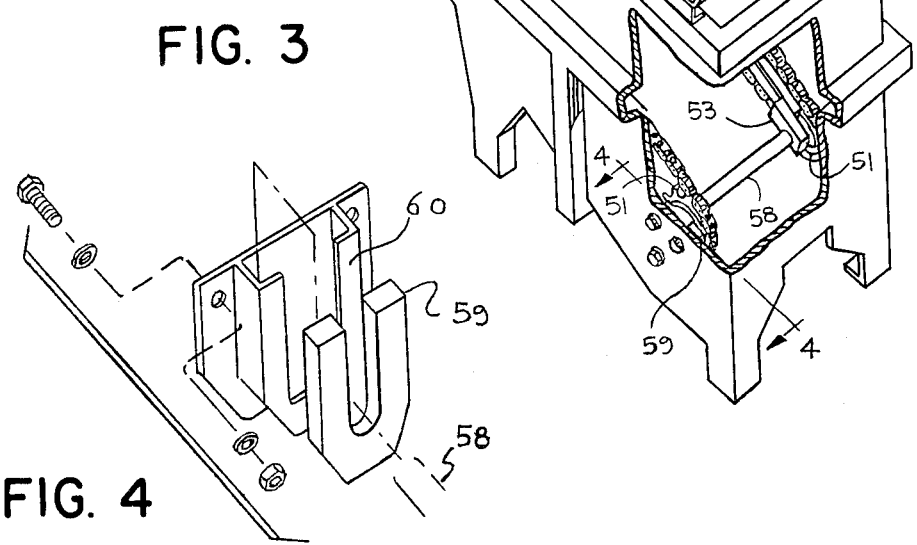

The apparatus or cleaning unit by which it is removed (FIGS. 4 and 5), comprises a series of scraper bars 48 carried on chains 50, which in turn run around pinions 51 and 52. Pinions 51 and 52 are mounted on a common support frame 53, and a drive train including a motor indicated as 54 is mounted on an extension bracket 55, attached to an upper end of frame 53. Suitable timers and controls for operating motor 54 are contained in control panel 22. Attachment arms 56 are connected to the sides of frame 53 and are removeably fastened to tank 12 as by bolts 57. Such connection is designed to permit a certain range of movement of frame 53 in a generally upward arcuate manner for reasons described below. The lower pinions 51 are carried on a cross-shaft 58, the ends of which extend outwardly and are slideably supported in shoes 59, fastened in housings 60 on opposite sides of tank 12.

In order to remove filtered liquids from tank 14, any suitable means may be provided in the form of, for example, a drain or pumping means such as pump 61, and pipe 62. A liquid level sensor 64 may also be provided, connected to control panel 22, which is also connected to control motor 60.

Such tank 14 and its components are illustrated by way of example only. Filtrate in many cases can simply be moved directly and continuously to a further processing unit, or discharged, where such liquid will not contaminate the environment, and is not required for re-use.

A flow control valve 66 is provided for pipe 40 to reduce flow of filtrate in some circumstances.

If desired a closure valve device, shown schematically as 67 may be provided for mixture pipe 38. Valve 67 would be operated by operating means (not shown) such as a motor or solenoid controlled by panel 22.

A cleaner screw 68 is located in restricted neck 70 in pipe 38, and operated by shaft 72 and motor 74. Screw 68 is rotated at a pre-set speed to control flow of mixture down pipe 38.

Three basic modes of operation are possible corresponding to different concentrations of solids in the mixture. For convenience these modes may be designated, heavy, medium, and light duty.

Heavy duty mode

Unfiltered mixture is passed to tank 10 down conduit 16. When the high level sensor 18 is activated, the control panel 22 will then cause pump 26 to operate, pumping mixture from tank 10 to separator tank 12.

The liquid in the mixture in separator tank 12 will pass through the screen 36, down the sloping wall 34 and out of the filtrate drain pipe 40 into tank 14. Solids will be retained on screen 36. Unfiltered mixture will flow back into tank 10 through mixture drain pipe 38.

In this heavy duty mode pump 26 may operate continuously, or relatively frequently on an intermittent cycle. Motor 54 will operate continuously causing movement of chains 50 and scrapers 48 over screen 36. Solids will accumulate rapidly during this type of operation and will thus be removed continuously. This mode of operation will continue only so long as a high concentration of solids exists in the mixture.

Medium Duty Mode

In this mode of operation solids will build up more gradually. Accordingly, the motor 54 will operate on an intermittent cycle.

In this mode pump 26 will operate either continuously or intermittently, as necessary to maintain the mixture level in tank 12.

Pipe 38 is open to tank 10, and mixture will continuously drain from tank 12 back into tank 10.

Liquid filtrate will pass through screen 36 causing solids to build up gradually into a cake. When the liquid level in tank 12 ceases to change significantly, pump 26 will cease operation. The control panel 22 will then delay pump 26, permitting unfiltered liquid to flow back into tank 10, thereby draining tank 12. This leaves the solids as a more or less dry filter cake on the screen 36. The control panel 22 then operates motor 54 causing removal of such filter cake. Panel 22 then halts motor 54 and re-starts pump 26.

This mode of operation is advantageous in removing more finely divided solids. Turbulence in tank 12 is reduced due to the fact that motor 54 does not operate while there is liquid in the tank. Consequently the filter cake can build up undisturbed. Removal of the filter cake is carried out in the absence of liquid. Consequently, there is no loss due to re-mixing.

Light Duty Mode

In this mode of operation closure valve 66 is opened and closed in timed relation to the operation of pump 26, by any suitable operating means (not shown) connected to control panel 22. In this case, pump 26 will not operate as frequently. The mixture will thus remain in tank 12 a greater length of time, allowing the liquid to pass through screen 36, over a longer period.

The lower concentration of solids will thus build up slowly on screen 36, with a minimum of turbulence. As the level sensor in tank 12 detects a predetermined drop, pump 26 is again operated to make up the level.

Valve 66 may be set to reduce flow of filtrate if this is flowing too freely, or without adequate filtration.

As before, when the sensors indicate that the screen 36 is no longer passing liquids, due to the accumulation of filter cake, pump 26 ceases operation and the mixture in tank 12 drains out. Motor 54 then operates chains 50 to remove the filter cake from screen 36.

Figure 2:
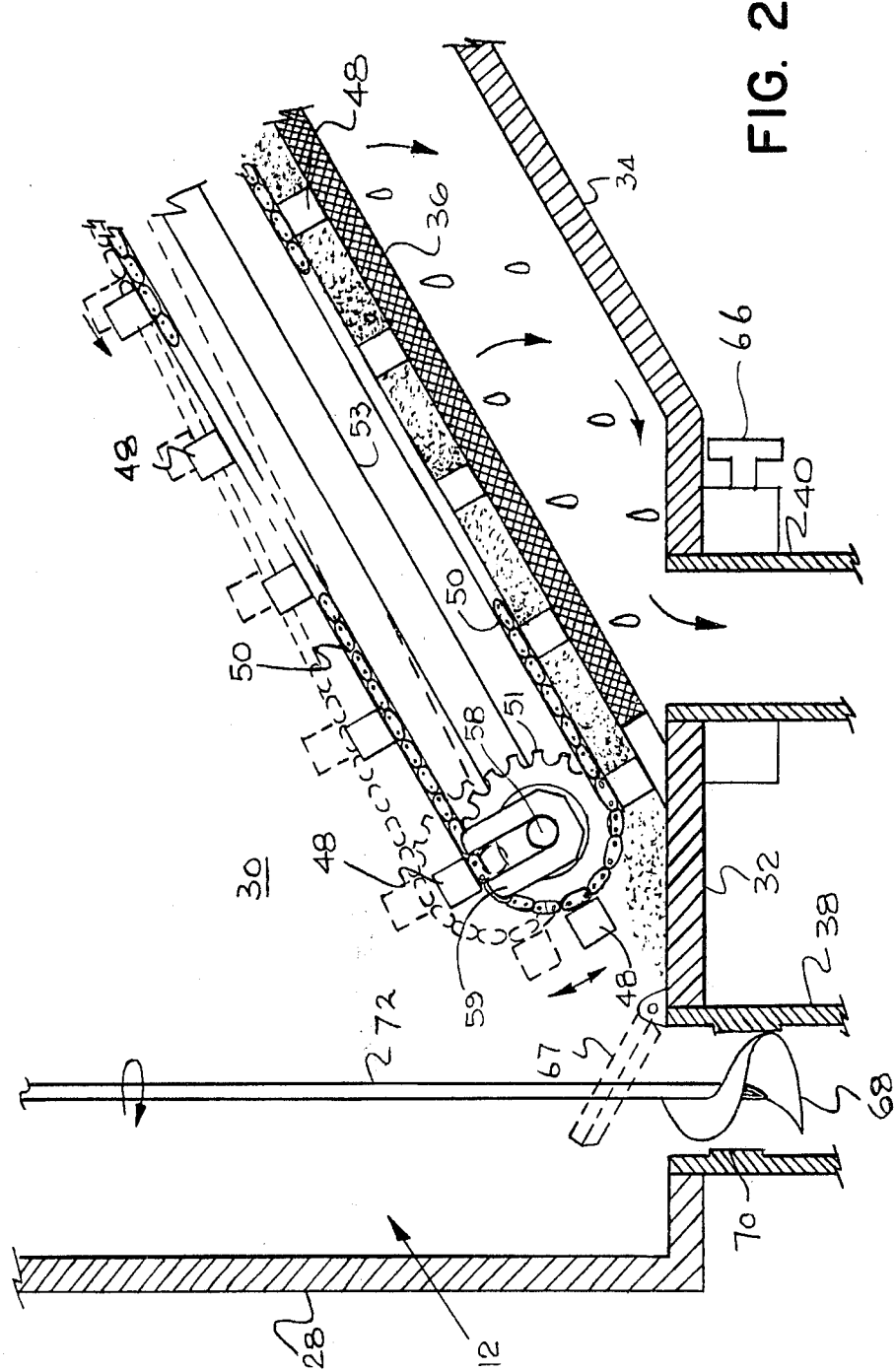
FIG. 2 is an enlarged section along the line 2—2 of FIG. 1.
Figure 3:
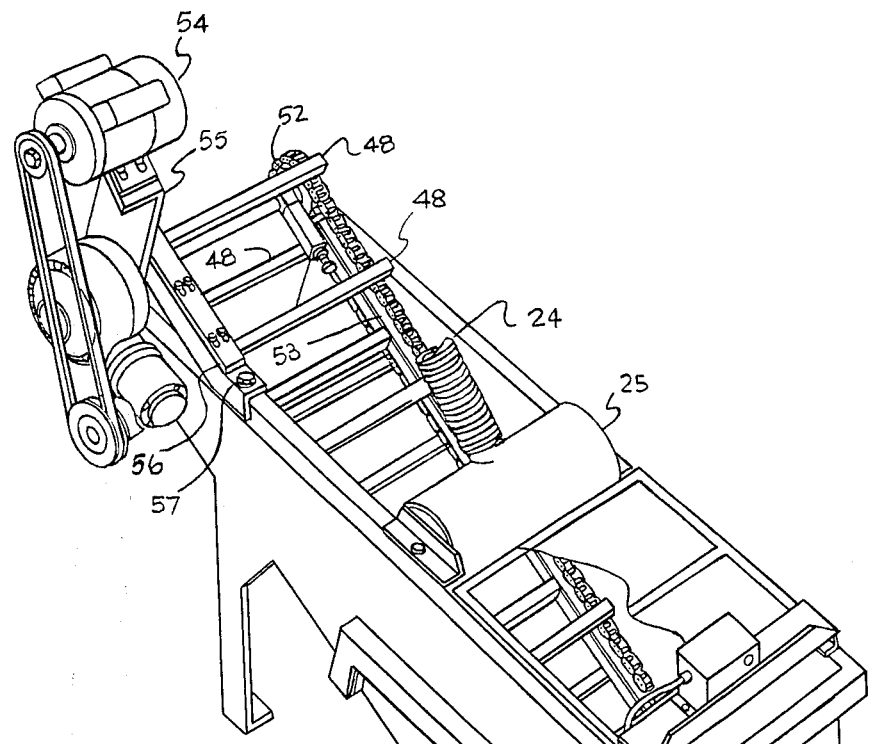
FIG. 3 is an upper perspective of the apparatus of FIG. 1, partially cut away, and, FIG. 4 is an enlarged cut-away perspective of a detail of FIG. 3.

If, in any of these modes, the bars 48 encounter an obstruction such as a large, hard piece of solids, i.e. a stone, or a metal object, the entire cleaning unit can swing upwardly away from screen 36. This movement is permitted by frame 53 and the moveable attachment created by arms 56 and bolts 57. Such obstruction can then pass under one of bars 48, and be moved upwardly over screen 36 without damage (see FIG. 2).

Where a tank 14 is used then, when the sensor 64 in tank 14 is activated, control panel 22 will then cause pump 61 to operate passing filtrate from tank 14 out through pipe 62.

In all modes of operation screw 68 will normally be rotated at a speed designed to regulate flow of mixture back to tank 10, and also maintain pipe 38 clear.

It will thus be seen that by the operation of the invention, mixtures containing solids, including finely divided solids, and large particles may be subjected to a thorough filtering operating to remove a very large proportion of such solids, and producing a filtered liquid (filtrate) which is ready for further processing in any suitable manner, or in some cases can be re-used or discharged.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Separator apparatus for separating a mixture of liquids and solids and comprising;
    a separating tank;
    means for passing a mixture of liquids and solids to said separator tank;
    screen means in said separator tank dividing said separator tank into a mixture compartment, on one side of said screen means, and a filtrate compartment on the other side of said screen means;
    mixture conduit means for removing mixture from said mixture compartment of said separator tank;
    filtrate conduit means extending from said filtrate compartment of said separator tank;
    scraper mounting frame means adjacent to said screen means;
    conveyor means movable on said mounting frame means;
    scraper bar means on said conveyor means for moving over said screen means and moving material therefrom, and,
    movable frame supporting means at at least one end of said mounting frame means, said mounting frame means being movable in said frame supporting means, whereby to permit said mounting frame means, and said conveyor means and said scraper bars to move momentarily away from said screen means to avoid an obstruction.

2. Separator apparatus as claimed in claim 1 wherein said frame supporting means comprise at least two generally U-shaped slotted members, and including rod members on said mounting frame means extending into said U-shaped slotted members, and being slidably movable therealong to provide movement of said mounting frame means as aforesaid.

3. Separator apparatus as claimed in claim 2 wherein said frame means and said screen means are mounted at an angle in said tank, and wherein said frame means defines upper and lower ends, said frame supporting means being located adjacent said lower end, and including frame fastening means adjacent an upper end of said mounting frame means, said frame fastening means being releasably attachable to said tank, and securing the same in position therein and permitting movement of at least the lower end of said frame ends.

4. Separator apparatus as claimed in claim 3 wherein said frame supporting means comprise at least two generally U-shaped slotted members, and including rod members on said mounting frame means extending into said U-shaped slotted members, and wherein said frame means and said conveyor means are removable from said tank, by disengagement of said frame fastening means, and releasing said rod members from said U-shaped members.

5. Separator apparatus as claimed in claim 1 including movable flow metering means associated with said mixture conduit means, and motor means for moving the same, whereby to continuously clear said mixture conduit means and simultaneously regulate flow of said mixture from said mixture compartment of said separator tank.

6. Separator apparatus as claimed in claim 5 wherein said flow metering means comprises a spiral auger member, and rod means on which said auger member is mounted, said rod means extending upwardly through said tank, and said motor means being mounted on an upper portion of said tank above the level of liquids therein.

7. Separator apparatus as claimed in claim 5 including control means for controlling of mixture to and from said separator tank, and for filling and emptying same, and for causing operation of said scraper means only when said separator tank is empty of said mixture, and ensuring that said scraper means remains stationary while said tank contains said mixture.

8. A separator system for separating a mixture of liquids and solids and comprising;
    a mixture storage tank;
    a filtrate accumulator tank, said storage and accumulator tanks being located side by side closely adjacent to one another;
    a separator tank being mounted above said storage and accumulator tanks;
    mixture conduit means connected between said storage tank and said separator tank for passing unfiltered mixture to said separator tank;
    return conduit means for returning mixture from said separator tank to said storage tank, unfiltered;
    screen means in said separator tank dividing same into a mixture compartment on one side and a filtrate compartment on the other side;

solids removal means operable to clear solids from said screen means when said separator tank is empty, and being out of operation when said tank is full of mixture;

filtrate conduit means extending between said filtrate compartment of said separator tank and said accumulator tank, for passing filtrate from said filtrate compartment to said accumulator tank;

supply pump means in said storage tank, intermittently operable to pump unfiltered mixture from said storage tank to said separator tank;

filtrate pump means in said accumulator tank, intermittently operable to pump filtrate from said accumulator tank;

level sensing means in said storage tank and in said accumulator tank, for controlling operation of said respective supply and filtrate pump means;

separator tank level sensing means for sensing the level of mixture in said separator tank and controlling said supply pump means for operation thereof, and, control means for discontinuing operation of said pump means whereby said separator tank may be permitted to drain, and said control means being further operable to subsequently cause commencement of operation of said solids removal means, when said separator tank has drained, and subsequently cause termination of such operation, and then causing commencement of operation of said pump means whereby to refill said tank with mixture once more.

* * * * *